Patented Jan. 22, 1935

1,988,501

UNITED STATES PATENT OFFICE 1,988,501

PREPARATION OF ARYL THIOGLYCOLLIC ACIDS

Herbert August Lubs and Arthur Lawrence Fox, Wilmington, Del., and Robert Archie Smith, Pennsgrove, N. J., assignors to E. I. du Pont de Nemours & Company, Wilmington, Del., a corporation of Delaware No Drawing. Application February 27, 1931, Serial No. 518,886

23 Claims. (Cl. 260—108)

This invention relates to the preparation of the organic chemical compounds represented by the general formula

wherein R represents a substituted or unsubstituted aryl nucleus.

More particularly it relates to the preparation of such compounds from other chemical compounds having the formula

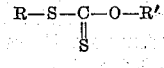

wherein R represents a substituted or unsubstituted aryl nucleus and R' represents an alkyl group. These starting compounds hereinafter called "xanthate oils" are sometimes referred to as xanthic ester oils.

It is known in the art that "xanthate oils" can be produced by diazotizing the corresponding primary aromatic amine (R—NH₂) and reacting the resultant with an alkali-metal-alkyl-xanthate. It is with the conversion of the resulting "xanthate oils" to thio-glycollic acids that this invention deals specifically.

This invention is the result of work carried out in an endeavor to develop a satisfactory process for the production of aryl thio-glycollic acids from the corresponding aryl-alkyl-xanthates ("xanthate oils"). Other objects were the production of thio-glycollic acids of improved quality and greater yields, and in general an advancement of the art. Other objects will appear hereinafter.

These objects are realized by treating a mixture of a "xanthate oil", a halo-acetic acid, and an organic solvent or solvents with a hydrolyzing agent. The organic solvent dissolves the xanthate oil and facilitates its decomposition to the corresponding mercaptan by the action of the hydrolyzing agent.

The invention will be readily understood from a consideration of the following examples in which the parts are given by weight.

Example I

One hundred twenty-three (123) parts of the "xanthate oil" obtained by diazotizing 2-amino-5-chlorotoluene and reacting the resultant product with potassium-ethyl xanthate, was mixed with 500 parts of 65% ethyl alcohol and 60 parts of chloro-acetic acid. The resultant mixture was heated with stirring to 65–70° C. and 200 parts of 40% sodium hydroxide solution was added rapidly. The reaction was very vigorous but could be controlled by the rate of addition of the sodium hydroxide. When the addition was complete the resultant reaction mass was stirred for about 10 minutes, treated with 500 parts of water and the alcohol distilled off. After the removal of the alcohol the solution was extracted twice with 100 part portions of toluene and then boiled with bone black, filtered and cooled. The filtrate was gradually acidified and the resulting 2-methyl-4-chlorophenyl-thio-glycollic acid filtered off. A very desirable yield of a product of excellent purity was obtained.

The reaction taking place is probably illustrated by the following equation:

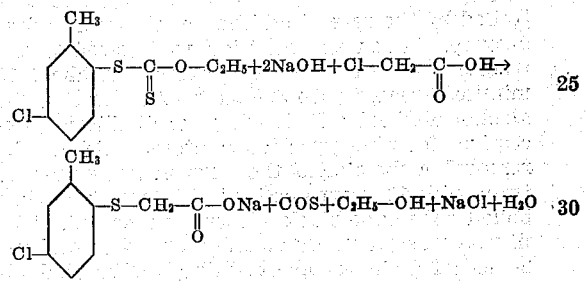

Example II

Another run similar to Example I was carried out substituting an equal volume of 95% ethyl alcohol for the 65% ethyl alcohol previously used. High yields of the product of excellent quality were obtained in this case also.

Example III

Another run similar to Example I was carried out substituting an equal volume of 80% acetone for the 65% of ethyl alcohol. A product of excellent purity was obtained. The yield in Example I was slightly higher however.

Example IV

Another run similar to Example I was carried out substituting an equal volume of 50% ethylene-glycol-mono-ethyl-ether for the 65% ethyl alcohol. As in the above examples a product of excellent quality was obtained. The yield was even higher than that obtained in Example I.

Example V

Another run similar to Example I was carried out except that for the 500 parts of 65% alcohol there was substituted an equal volume of a mixture of alcohol (95%) and benzene mixed in the proportion 4 to 1 by volume. Very high yields of a very pure product were obtained.

Example VI

Another run similar to Example I was carried out in which the 500 parts of ethyl alcohol was replaced by an equal volume of methyl alcohol. Yields considerably higher than those of Example I were obtained. The product was of excellent purity.

Example VII

Another run similar to Example I was carried out. In this run the 500 parts of ethyl alcohol was replaced by an equal volume of N-butyl-alcohol. A fair yield of a product of excellent purity was obtained.

Example VIII

Another run similar to Example I was carried out. In this run the 500 parts of ethyl alcohol was replaced by a like volume of iso-propyl alcohol. The product was of excellent purity and the yield was greater than in either Examples I and VII.

Example IX

One hundred ninety-two (192) parts of the "xanthate oil" obtained by diazotizing 2-amino-5-chloro-toluene and reacting the resultant with potassium lauryl xanthate, was mixed with 500 parts of 95% ethyl alcohol and 60 parts of chloroacetic acid. The resultant mixture was heated with stirring to 65–70° C. and 200 parts of 40% sodium hydroxide solution was added rapidly. The reaction was very vigorous but could be controlled by the rate of addition of the sodium hydroxide. When the addition was complete the resultant reaction mass was stirred for about 10 minutes, treated with 500 parts of water and the alcohol distilled off. During the distillation excessive foaming was encountered. After the removal of the alcohol the solution was extracted twice with 100 part portions of toluene and then boiled with bone black, filtered and cooled. The filtrate was gradually acidified and the resulting 2-methyl-4-chloro-phenyl-thio-glycollic acid filtered off. A very desirable yield of a product of extraordinary purity was obtained.

In the Examples I to VIII the same "xanthate oil" has been referred to throughout. It is to be understood, however, that this has been done merely for convenience. As will be clear the "xanthate oil" may contain other alkyl radicals for instance the lauryl radical of Example IX. Wide variation is also possible in the aryl radical of the "xanthate oil", the process being generally applicable to compounds represented by the general formula set out in the first part of the specification. Especially satisfactory results have been obtained in the production of such compounds as 2,5-di-methoxy-phenyl-thio-glycollic acid, 2,5-di-methyl-4-chloro-phenyl-thio-glycollic acid, 2,4-di-methyl-phenyl-thio-glycollic acid, 2-methoxy-phenyl-thio-glycollic acid, 2-methoxy-4-chloro-phenyl-thio-glycollic acid, 2-naphthyl-thio-glycollic acid, 2-methyl-3-chloro-phenyl-thio-glycollic acid, 4-morpholine-phenyl-thio-glycollic acid, 2-chloro-phenyl-thio-glycollic acid, and 2,4,5-tri-chloro-phenyl-thio-glycollic acid.

It has been found that in numerous instances it is desirable to operate the process under pressures in excess of atmospheric. By so doing higher reaction temperatures are obtainable.

Ordinarily the amount of the halo-acetic acid used is slightly in excess of that technically required in the reaction. Other halo-acetic acids, for example, bromo-acetic acid, are suitable for use in the above reaction.

In Example I mention has been made of bone black. The process is not limited to this particular compound, however, as other decolorizing materials, for example, charcoal, may be used.

While potassium xanthate is mentioned in the examples it should be understood that other alkali metal xanthates, for instance sodium xanthate are suitable.

The hydroxides of the alkali metals are especially desirable as hydrolyzing agents.

Throughout the specification and claims when the word "alcohol" is used generally it is intended to cover poly-hydroxy as well as mono hydroxy branched and straight chain alcohols.

The process set out above is of great technical value and as will be obvious is very wide-spread in its application. The results obtained are superior to that of any other method now known to applicants.

As many apparently widely different embodiments of this invention may be made without departing from the spirit and scope thereof it is to be understood that we do not limit ourselves to the specific embodiments thereof except as defined in the appended claims.

We claim:

1. The process of preparing 2-methyl-4-chloro-phenyl-thio-glycollic acid which comprises mixing ethyl alcohol and chloracetic acid with ethyl 2-methyl-4-chloro-phenyl-xanthate, adding sodium hydroxide, removing the alcohol and acidifying.

2. The process of preparing a compound of the formula

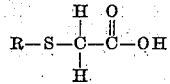

wherein R represents a substituted or unsubstituted aryl nucleus not containing a substituent which preferentially reacts with a halo-acetic acid, which comprises mixing a compound of the formula

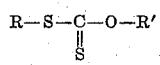

wherein R' represents an alkyl group, with an alcohol and chloracetic acid, adding an alkali metal hydroxide, removing the alcohol, acidifying and separating the product.

3. The process of preparing a compound of the formula

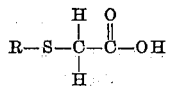

wherein R represents a substituted or unsubstituted aryl nucleus not containing a substituent which preferentially reacts with a halo-acetic acid, which comprises mixing a compound of the formula

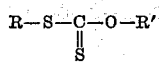

wherein R' represents an alkyl group, with an organic solvent and chloracetic acid, adding an alkali metal hydroxide, removing the organic solvent, acidifying and separating the product.

4. The process which comprises mixing a compound of the formula

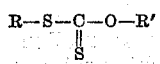

wherein R represents a substituted or unsubstituted aryl nucleus not containing a substituent which preferentially reacts with a halo-acetic acid and R' represents an alkyl group with an alcohol and a mono-halo-acetic acid and thereafter hydrolyzing the xanthate oil in the mixture with alkali.

5. In the process of preparing a compound of the formula

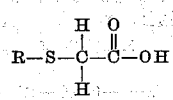

wherein R represents a substituted or unsubstituted aryl nucleus not containing a substituent which preferentially reacts with a halo-acetic acid, the step of mixing a compound of the formula

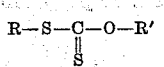

wherein R' represents an alkyl group, with an alcohol and chloracetic acid, adding an alkali metal hydroxide, removing the alcohol and acidifying.

6. In the process of preparing a compound of the formula

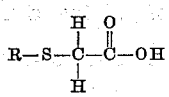

wherein R represents a substituted or unsubstituted aryl nucleus, not containing a substituent which preferentially reacts with a halo-acetic acid, the steps of mixing a compound of the formula

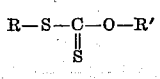

wherein R' represents an alkyl group, with an alcohol and chloracetic acid, adding an alkali metal hydroxide, and removing the alcohol.

7. In the process of preparing a compound of the formula

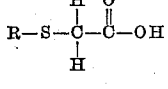

wherein R represents a substituted or unsubstituted aryl nucleus not containing a substituent which preferentially reacts with a halo-acetic acid, the steps of mixing a compound of the formula

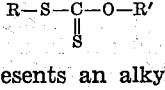

wherein R' represents an alkyl group, with an alcohol and chloracetic acid, and adding an alkali metal hydroxide.

8. In the process of preparing a compound of the formula

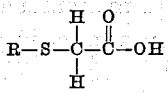

wherein R represents a substituted or unsubstituted aryl nucleus not containing a substituent which preferentially reacts with a halo-acetic acid, the steps of mixing a compound of the formula

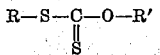

wherein R' represents an alkyl group, with an ether of a poly-hydroxy alcohol and chloracetic acid, and adding an alkali metal hydroxide.

9. In the process of preparing a compound of the formula

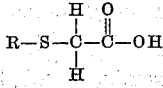

wherein R represents a substituted or unsubstituted aryl nucleus not containing a substituent which preferentially reacts with a halo-acetic acid, the steps of mixing a compound of the formula

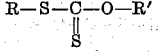

wherein R' represents an alkyl group, with a poly-hydroxy alcohol and chloracetic acid, and adding an alkali metal hydroxide.

10. In the process of preparing a compound of the formula

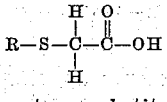

wherein R represents a substituted or unsubstituted aryl nucleus not containing a substituent which preferentially reacts with a halo-acetic acid, the steps of mixing a compound of the formula

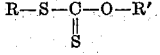

wherein R' represents an akyl group, with a branched chain alcohol and chloracetic acid, and adding an alkali metal hydroxide.

11. In the process of preparing a compound of the formula

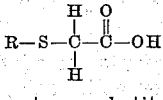

wherein R represents a substituted or unsubstituted aryl nucleus not containing a substituent which preferentially reacts with a halo-acetic acid, the steps of mixing a compound of the formula

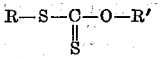

wherein R' represents an alkyl group, with an inert solvent and an alcohol and chloracetic acid, and adding an alkali metal hydroxide.

12. In the process of peparing a compound of the formula

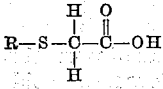

wherein R represents a substituted aryl nucleus not containing a substituent which preferentially reacts with a halo-acetic acid, the steps of mixing a compound of the formula

wherein R' represents an alkyl group, with an alcohol and chloracetic acid, and adding an alkali metal hydroxide.

13. In the process of preparing a compound of the formula

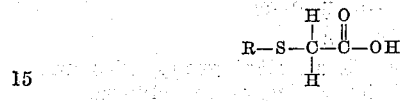

wherein R represents an unsubstituted aryl nucleus, the steps of mixing a compound of the formula

wherein R' represents an alkyl group, with an alcohol and chloracetic acid, and adding an alkali metal hydroxide.

14. In the process of preparing a compound of the formula

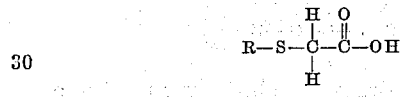

wherein R represents an aryl nucleus having one or more substituents belonging to the group consisting of alkyl, alkoxy, halogen and morpholine, the steps of mixing a compound of the formula

wherein R' represents an alkyl group, with an alcohol and chloracetic acid, and adding an alkali metal hydroxide.

15. In the process of preparing a compound of the formula

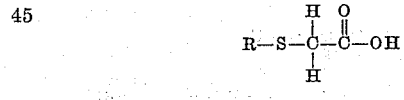

wherein R represents an aryl nucleus having one or more substituents belonging to the group consisting of alkyl, alkoxy and halogen, the steps of mixing a compound of the formula

wherein R' represents an alkyl group, with an alcohol and chloracetic acid, and adding an alkali metal hydroxide.

16. In the process of preparing a compound of the formula

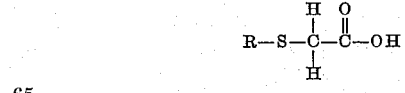

wherein R represents an aryl nucleus having one or more substituents belonging to the group consisting of alkyl and halogen, the steps of mixing a compound of the formula

wherein R' represents an alkyl group, with an alcohol and chloracetic acid, and adding an alkali metal hydroxide.

17. In the process of preparing a compound of the formula

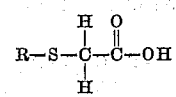

wherein R represents a substituted or unsubstituted naphthyl nucleus not containing a substituent which preferentially reacts with a halo-acetic acid, the steps of mixing a compound of the formula

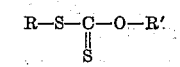

wherein R' represents an alkyl group, with an alcohol and chloracetic acid, and adding an alkali metal hydroxide.

18. In the process of preparing a compound of the formula

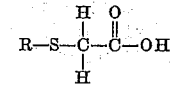

wherein R represents a substituted or unsubstituted phenyl nucleus not containing a substituent which preferentially reacts with a halo-acetic acid, the steps of mixing a compound of the formula

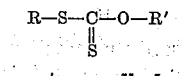

wherein R' represents an alkyl group, with an alcohol and chloracetic acid, and adding an alkali metal hydroxide.

19. In the process of preparing a compound of the formula

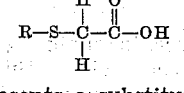

wherein R represents a substituted or unsubstituted aryl nucleus not containing a substituent which preferentially reacts with a halo-acetic acid, the steps of mixing a compound of the formula

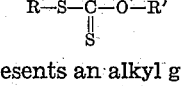

wherein R' represents an alkyl group, with an alcohol and chloracetic acid, and adding an alkali metal hydroxide while maintaining pressures in excess of atmospheric.

20. In the process of preparing a compound of the formula

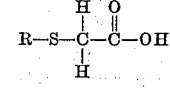

wherein R represents a substituted or unsubstituted aryl nucleus not containing a substituent which preferentially reacts with a halo-acetic acid, the steps of mixing a compound of the formula

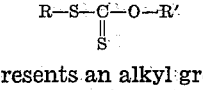

wherein R' represents an alkyl group, with water, an alcohol and chloracetic acid, and adding an alkali metal hydroxide.

21. The process of preparing an aryl thioglycollic acid which comprises reacting with an alkaline hydrolyzing agent upon a water insoluble aryl-alkyl-xanthate in the presence of a mono halogen acetic acid and in an organic medium which is a solvent for the aryl-alkyl-xanthate.

22. The process of preparing an aryl thioglycollic acid which comprises reacting with aqueous caustic solution upon a water-insoluble aryl-alkyl-xanthate in the presence of a mono halogen acetic acid and in an alcoholic medium.

23. In the process of preparing an aryl thio-glycollic acid by hydrolyzing an aryl-alkyl-xanthate to produce an aryl mercaptan and reacting the latter with a mono halogen acetic acid, the improvement which comprises carrying out the two reactions concurrently and in an organic liquid medium which is a solvent for the aryl-alkyl-xanthate and which is substantially inert toward alkali and halogen acetic acid.

HERBERT AUGUST LUBS.
ARTHUR L. FOX.
ROBERT A. SMITH.